Jan. 6, 1970    T. D. MacGRANDLE ET AL    3,488,665
STIFFENING PROCESSES WITH TWO-PART HOT-MELT
THERMOSETTING COMPOSITIONS
Filed Dec. 17, 1968
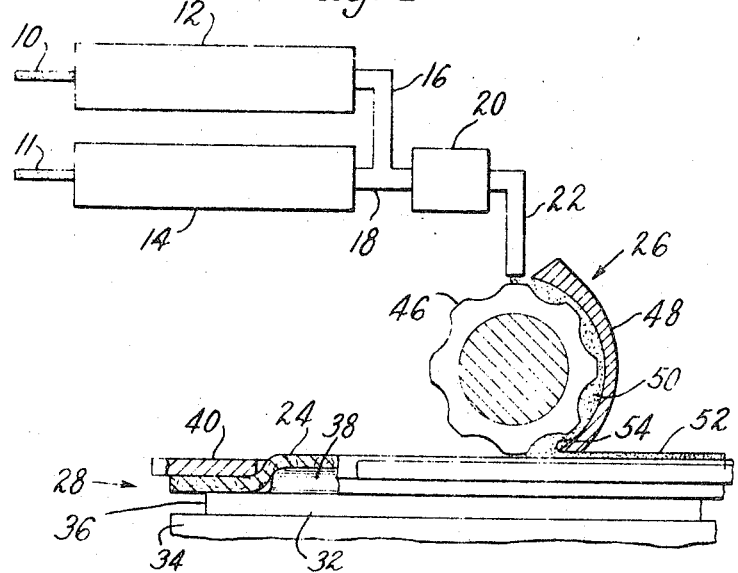
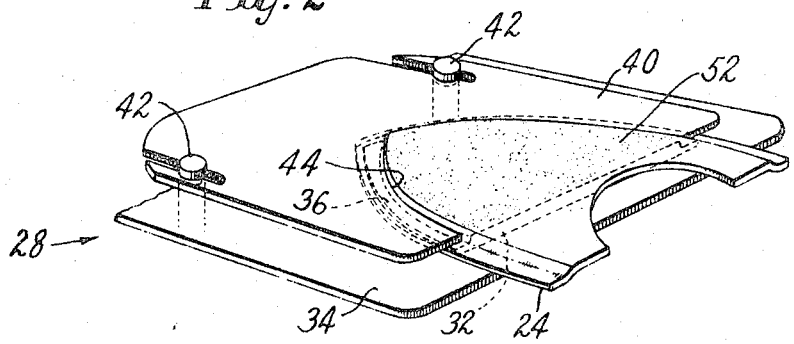
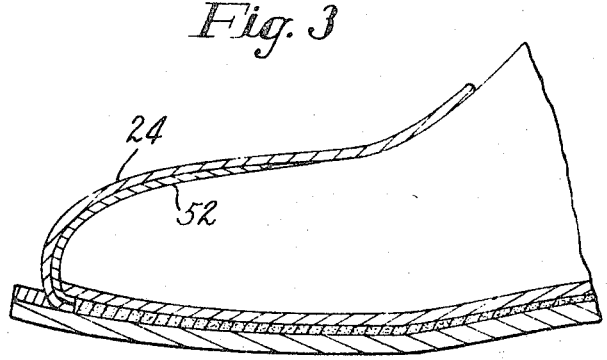
Inventors
Timothy D. MacGrandle
Paul Taylor
Conrad Rossitto
By their Attorney
Benjamin C. Pollard

United States Patent Office 3,488,665
Patented Jan. 6, 1970

3,488,665
STIFFENING PROCESSES WITH TWO-PART HOT-MELT THERMOSETTING COMPOSITIONS
Timothy D. MacGrandle, Maywood, N.J., and Paul Taylor, North Andover, and Conrad Rossitto, Andover, Mass., assignors to USM Corporation, Flemington, N.J., a corporation of New Jersey
Filed Dec. 17, 1968, Ser. No. 784,360
Int. Cl. A43d 5/00
U.S. Cl. 12—146          8 Claims

ABSTRACT OF THE DISCLOSURE

Stiffening process for sheet material particularly for shoe parts in which normally solid synthetic polymer resin material having components reactive to cure the resin, is spread in hot viscous molten condition as a thin layer, cooled to solid state with at least limited shape retaining ability while the resin material is still capable of permanent deformation and finally cured to hard, resilient heat resisting condition.

DESCRIPTION OF THE PRIOR ART

Thermoplastic resinous material has been melted and applied as a thin layer to sheet materials such as shoe parts and cooled to provide a resilient stiff layer. This procedure is shown for use in stiffening the toe and counter portions of a shoe upper in the U.S. patent to Chaplick et al. 3,316,573 issued May 2, 1967 and can also be used for the stiffening of collars, cuffs and other parts of garments. The stiffening has been found effective to insure shape retention of the sheet material with which the resinous material is associated. However, particularly where the stiffened article is subjected to relatively high temperatures, the thermoplastic stiffening material has had some tendency to lose its shape-holding ability.

It is an object of the present invention to provide a stiffening process having improved shape retention and other physical properties.

To this end and in accordance with a feature of the present invention, I have provided a stiffening process in which normally solid synthetic polymer resin composites including components reactive to cure the resin material are melted and applied while still in molten condition to surfaces to be bonded or stiffened. The melted material hardens rapidly on cooling to provide an initial stiffening and thereafter cures to a more heat resistant condition in which it provides superior ability to retain its shape.

The invention will be described in connection with the attached drawings forming part of the disclosure of the present invention.

In the drawings:

FIG. 1 is a diagrammatic elevational view of one form of melting, mixing and applying unit for applying a stiffener layer to a shoe part according to the present invention;

FIG. 2 is an annular view of a portion of the applying apparatus of FIG. 1 showing a useful form to holddown for a shoe part to be stiffened; and FIG. 3 is a partial sectional elevational view of a completed stiffened shoe part.

The preferred method involves combining two or more normally solid synthetic polymer resin components of which one resin component contains groups reactive with groups in a second component to effect curing when the components are mixed. It is, however, possible to employ a single resinous component containing groups or a catalyst which are or is inactive at normal room temperature but, which becomes active on heating, agitation, working or the like to effect cure.

Each of the compositions for combination in accordance with the preferred method of the present invention includes a normally solid synthetic polymer resin capable of being melted to a viscous fluid and of remaining in fluid condition while hot until combined with the second material. By this system it is possible to apply the final composition in continuous or discontinuous manner since the materials for combination are relatively stable and are only converted to infusible condition after combining of the mutually reactive components. Mutually reactive components are selected which will combine to form a resinuous material which will remain fusible and formable for a time long enough for application and shaping e.g. of a shoe and will then cure to stiff infusible condition within a relatively short time.

It is generally preferred to provide the mutually reactive synthetic polymer resin materials in the form of separate flexible rods which may be separately melted in separate heating and melting devices such as that disclosed in the patent to Hans C. Paulsen 2,765,768 which issued Oct. 9, 1956; but it is also possible to provide the mutually reactive resinous materials in a cylinder or bulk form for melting in other known melting devices such as glue pots. The provision of a resin supply in the form of at least two flexible rods of substantially uniform cross section and indefinite length enables accurate control of the ratio in which the resin compositions are combined through control of the feeding rates of the respective rods. In other words, by feeding a predetermined length of one rod for each unit length of the other rod, the relative proportions of the two materials which are combined is controlled. Some degree of control of setting time and of the physical properties of the reaction product such as hardness, toughness and the like may be controlled by selection of the relative lengths of each rod fed. The two-rod system of supply forms the subject matter of a patent application Ser. No. 741,266, filed July 1, 1968 entitled "Two-Rod Hot-Melt Thermoplastic Adhesive" in the name of W. R. Battersby et al. which is a continuation-in-part of a patent application of the same title and inventors, Ser. No. 699,357, filed Jan. 22, 1968.

A wide variety of reactive compositions may be used. However, each of the reactive compositions will include a substantial proportion of heat fusible synthetic polymer resin. Where the reactive compositions are supplied in rod form, the compositions of the rods must be dry, non-tacky, flexible and sufficiently hard to enable the rods to be coiled and to be uncoiled for use as needed without cracking and also sufficiently stiff to enable the rods to be pushed into an entrance port of melting devices for reduction to a fluid condition.

It is preferred that the synthetic polymer resin of one of the two reactive compositions contain on its polymer chain reactive groups for cooperation with reactive groups in the second of the reactive compositions. The interaction may be a chemical combination of the reactive groups of one composition with reactive groups of the second composition; or the groups of one composition may provide a catalytic reaction on reactive groups of the second composition to form a heat resistant resinous product; or one composition may contain groups which exert catalytic action on as well as groups which react with reactive groups of the second composition. Combinations of any of the above systems may be employed.

Synthetic polymer resins of many types may be used, such as polyamides, polyesters, polyepoxides, polyurethanes and so on. Polymer resins in which reactive or catalytic groups are easily introduced are particularly useful. For example, polyamide resins may be prepared by known procedures to include primary, secondary or tertiary amine groups along the polymer chain or at the terminals of the polymer chain. Such amine groups may exert catalytic or reactive action on groups joined to the polymer resin of a second component. In such second component, for example, a polyamide reacted to include epoxy groups will cooperate with the reactive groups above referred to. Tertiary amine groups on the first component may catalyze self-condensation of such an epoxy-containing polyamide. Primary amine groups may react with the epoxy groups of the polymer resin of the second component. In some instances there may also be a reaction between the amide group of one component and the epoxy group of the other component.

Other reactive systems may be based on isocyanate, carbodiimide, phenol aldehyde and other known curing type resin system. With the isocyanate based system, for example, one component may have an —NCO or blocked —NCO containing polymer while the other may have groups such as —OH, —COOH—NH$_2$ or other groups providing active hydrogen for reaction with the —NCO. Also one component may comprise catalytic material. Combinations of reactive materials of different systems or types in one or the other of the components may also be used.

The apparatus shown in FIGS. 1 and 2 illustrates a system by which the invention may be practiced using two reactive compositions in the form of rods 10 and 11 and for convenience, the invention will be described as it is practiced with that apparatus. It is to be understood that the invention may be practiced using devices for melting bulk or formed bodies of the two reactive components and that the method may be practiced by hand.

As shown in FIG. 1 the apparatus includes separate melting devices 12 and 14 for heating and melting flexible uniform cross section rods 10 and 11. From the melting devices 12, 14 the molten materials move through conduits 16 and 18 to a chamber 20 where they are mixed in controlled relative proportions and pumped forward through conduit 22 to a device for applying the molten material to a work piece shown as the toe portion 24 of a shoe upper.

The applying device (see FIGS. 1 and 2) including an applicator head 26 and work holding means 28 which may be essentially the same as shown in the patent to Chaplick and Rossitto 3,316,573 and the description of apparatus in that patent is incorporated by reference. In the device, the applicator head 26 is positioned above the work holding means 28 which is operable to support toe portion 24 for engagement with the applicator head. The applicator head is movable to spread a thin layer of the molten mixture on desired areas of the workpiece.

The work holding means 28 includes a shaped back up pad 32 supported on a movable table 34, the pad 32 being made of a resilient material such as a foamed plastic, for instance, polyurethane or the like. As shown, in FIGS. 1 and 2, a marginal portion 36 of the pad 32 is thinner than central portion 38 so that the central portion 38 of the pad 32 projects above the marginal portion 36.

A clamp plate 40 is supported on posts 42 for relative movement with respect to the pad 32 to clamp a workpiece. The clamp plate 40 is provided with a cut out portion 44 which corresponds to the predetermined or selected area of a workpiece, e.g. a shoe upper component, to which a coating of the molten mixture is to be applied. In FIG. 2, the cut out is shown as having a semi-elliptical shape corresponding to the desired shape of a toe stiffening layer. Other shaped cut outs may be provided for stiffening other portions of a shoe, for example, a quarter or heel end section of an upper, an area in the eyelet portion of a shoe upper, a sling strap or the like.

When the clamp plate 40 and the pad 32 are operated to move them into work-holding relation, the portion 24 of the upper to be stiffened is disposed on the pad 32 and the clamp plate 40 is brought into clamping relation such that the portion of the upper located on the central portion 38 of the pad projects upward through the cut out portion 44 of the plate 40 above the level of the upper surface of the plate 40 while the marginal portions of the upper are squeezed between the plate and the top surface of the marginal portions 36 of the pad to insure smooth draping and a taut surface of the upper. It will be seen that the cut out portion 44 of the clamp plate 40 is in essential registration with the pad 32 in the work holding position.

Applicator heads of various types may be used. In the form shown, the head 26 includes a preferably fluted or serrated rotating applicator wheel 46 which is associated with heated member 48 to define a heated chamber 50 containing the molten stiffening material mixture. The applicator wheel 46 carries the molten synthetic polymeric mixture and wipes it and spreads it in contact with the portion 24 of the upper projecting through the cut out portion 44 of the clamp plate 40. The applicator head 26 is moved laterally so that the mixture of molten material is spread as a coating 52 over the whole portion of the upper exposed through the cut out portion of the plate. The thickness to which the mixed molten material is applied as a coating is determined by the positioning of the lower edge 54 of the member 48 of the applicator head 26 which serves as metering blade relative to the upper component.

After application of the coating 52, the upper is moved out of engagement with the applicator head and the clamp plate 40 is raised to permit removal of the now coated upper component 24.

The coating 52 of the molten synthetic polymeric material solidifies quickly through cooling to a resilient and flexible state so that coated uppers may be stacked together or otherwise conveniently handled within a period of seconds. At this stage the solidified material possesses at least limited shape retaining ability, but is permanently deformable and is still capable of at least partial fusion. In this condition, the shoe part is readily conformed to a last or other shaping device. In many cases, additional heat need not be supplied to allow this lasting while in other cases heating to soften the layer is useful in providing superior conformation of the shoe upper to a desired three-dimensional shape.

The following examples are given as of assistance in understanding the invention; but, it is to be understood the invention is not limited to the particular materials, procedures or conditions set forth in the examples.

EXAMPLE I

Rod A

Dimer acid and azelaic acid in the molar ratio of 3:1 were reacted and condensed with ethylene diamine and hexamethylene diamine in the molar ratio of 12:1. The acidic components were present in sufficient excess to form carboxyl terminated polyamide. The carboxyl terminated polyamide was reacted with dimethylaminopropyl amine to give an amine terminated polyamide having a melting pont of 150° C. and an amine value of 24.

1.5 mols of dimer acid and 0.5 mol of azelaic acid were reacted and condensed with 1.4 mols of ethylene diamine and 0.313 mol of hexamethylene diamine. To the condensation product there were added 0.4 mol of triethylene tetramine and the mixture was further reacted to form a resin having a melting point of 110–120° C. and an amine value of about 50.

90 parts by weight of the first of the above resins was melted and combined with 10 parts by weight of the second of the above resins and the mixture was extruded as a 3/16″ rod.

Rod B 2 mols of dimer acid were condensed with one mol of ethylene diamine and 0.3 mol of hexamethylene diamine to form a carboxyl terminated polyamide having a melting point of 98° C. and an acid number of 10. The material was melted and there was added for reaction 280 grams of an epoxy resin (epoxy equivalent weight 195) and 120 grams of an epoxy cresol Novolac (ECN 1280) having an average epoxy functionality of about 3.5. Reaction was carried out to an extent to bring the acid number to below one. The molten material was extruded as a 3/16″ rod at a temperature of 250° F.

Rods A and B were melted and mixed at 350° F. to 400° F. and spread in a layer of 0.040 inch in thickness as a stiffener for the counter portion of a shoe upper. At this stage, reaction of the rod materials was not complete and the shoe upper with the stiffener layer was lasted. The layer had sufficient stiffness at this stage to hold the shoe upper in the lasted shape; and the strength, stiffness, creep resistance and heat resistance of the stiffener layer continued to increase as curing progressed after the step of lasting.

EXAMPLE II

Rod A 1.75 mols of dimer acid and 0.25 mol of azelaic acid were condensed and polymerized with 1.2 mols of ethylene diamine and 0.513 mol of hexamethylene diamine. The resulting acid terminated polyamide was reacted and condensed with 0.4 mol of dimethylaminopropyl amine to form a resin having a melting point of 110° C. and an amine value of 18. The terminal groups of this polyamide were tertiary amines. The material was extruded as a rod of 3/16″ cross section.

Rod B 45 parts by weight of polypropylene glycol (molecular weight 2000) and 15 parts by weight of 1,6-hexane diol were reacted and condensed with 36 parts by weight of toluene diisocyanate to form an —NCO terminated prepolymer having an —NCO content of 5%. To this prepolymer there were added 9 parts by weight of glycidyl alcohol and this was reacted at 100° C. to form an epoxy terminated resin having an epoxy equivalent weight of 2900 and essentially no free —NCO groups. The melting point of this material was 85° C. This material was extruded as a 3/16″ rod.

These rods were fed to separate melting units at equal rates to supply equal quantities of molten material which were mixed rapidly and applied at a temperature of about 400° on the counter portion of a shoe upper. A layer 0.050″ in thickness was formed and solidified promptly after application to a pliable condition in which the material was still permanently deformable. The shoe upper with the stiffener layer in place was lasted and the layer at this stage had sufficient stiffness so that the shoe upper would retain its shape when removed from the last. The strength, stiffness and heat reistance of the stiffener layer continued to increase as curing progressed after the step of lasting. In a modification of this process where the lasted shoe upper was subjected to the conventional heat setting step after lasting, curing of the stiffener material was accelerated.

EXAMPLE III

Rod A 3.5 mols of terephthalic acid, 4.5 mols of isophthalic acid and 2 mols of sebacic acid were condensed with an excess of 1,4-butane diol to form an OH terminated polyester with an OH number of 30, a melting point of 75 to 100° C. 100 parts of this polyester was reacted with 24 parts of phenol-blocked bis 4-phenylmethylene diisocyanate at a temperature of 350° C. to 400° C. to split off phenol from the isocyanate to allow it to combine with the hydrogens on the hydroxyl terminated groups of the polyester. On cooling, phenol recombined with the residual isocyanate group on the diisocyanate residue so that the ultimate product was a polyester with blocked isocyanate terminal groups. The product had a melting point of 110° C. and was extruded as a 3/16″ rod.

Rod B 18.5 parts of terephthalic acid, 27 parts of isophthalic acid, 8 parts of hexahydrophthalic anhydride and 1 part by weight of trimellitic anhydride were condensed and polymerized with 45 parts by weight of 1,4-butane diol. This gave a somewhat branched chain hydroxyl terminated polyester having an OH number of 25 and a melting point of 110 to 120° C.

The rods were supplied to separate melting units and brought to molten condition at a temperature of 375° F. Equal weights of the molten materials were mixed and applied to the counter portion of a shoe upper and the shoe upper was processed further as described in Example I.

The stiffener provided satisfactory strength, stiffness and heat resistance when cure was complete.

Having thus described our invention, what we claim as new and desire to secure by Letters Patent of the United States is:

1. A method of stiffening flexible sheet material which comprises the steps of applying a coating of hot viscous molten synthetic polymeric material to the surface of an area of said sheet material to be stiffened, said synthetic polymeric material having components which react to convert said polymeric material to a cured heat resistant shape retaining state in which it is no longer fusible at temperatures effective to melt the original polymeric material, said synthetic polymeric material being applied at a temperature at which the synthetic polymeric material has a viscosity low enough to wet and adhere to said surface, said application being completed before increase in viscosity from the reaction of said components has progressed to a point to interfere with wetting and adhesion of said surface by said polymeric material, cooling the said material to form a resilient at least lightly adherent layer and completing the reaction of said components to convert said polymeric material to a cured heat resistant shape retaining state in which it is no longer fusible at temperatures effective to melt the original material.

2. A method as defined in claim 1 in which said sheet material is a shoe component, said synthetic polymeric material has a stiffness when cooled and solidified and before completion of the reaction of said components to provide through its strength and stiffness as a layer of the below-defined thickness the added stiffening needed to hold said shoe component in the desired configuration during removal from a shaping means, cooling the said material to form a resilient at least lightly adherent layer of the order of from about 0.010 to about 0.005 inch in thickness, applying conforming pressure to shape said shoe to the desired configuration before completion of said reaction and thereafter completing the reaction of said components to convert said polymeric material to cured, stiffly resilient heat-resistant shape retaining state at which it is no longer fusible at temperatures effective to melt the original material.

3. The method as defined in claim 2 in which said hot viscous molten synthetic polymeric material is prepared by separately heating at least two normally solid synthetic polymer resin materials to bring them to molten fluid condition, a first of said polymer resin materials containing groups which interact with groups in a second one of said polymer resin materials to form a cured resinous reaction product which will not melt at the melting point of either of the polymer resin materials and mixing said hot molten fluid polymer resin materials in proportions providing quantities of each of said groups for interaction to form said resinous reaction product and convert said synthetic polymeric resin mixture into heat resistant shape retaining state, applying the mixture in viscous molten condition to form a layer in intimate engagement with a sheet material to be stiffened before said reaction is complete and while said mixture is in said fluid condition, hardening said layer to stiffened condition by cooling and completing interaction of said groups to form said cured resinous reaction product.

4. The method as defined in claim 3 in which said two normally solid synthetic polymer resin materials are supplied as separate flexible slender rods of substantially uniform cross section and indefinite length, each of said rods being dry, non-tacky, with sufficient flexibility to be coiled and thereafter to be uncoiled for use as needed without cracking and being sufficiently stiff to be capable of being pushed into an entrance port of a melting and mixing device for reduction of successive lengths by heat to a fluid condition, and predetermined relative lengths of the two rods are melted and mixed together in said melting and mixing device to provide the quantity of each of said groups in the hot molten mixture for interaction to form said resinous reaction product.

5. The method as defined in claim 4 in which said first rod comprises synthetic polymer resin having groups chemically reactive with reactive groups of the polymer resin of said second rod to form said cured resinous reaction product.

6. The method as defined in claim 4 in which a first rod comprises synthetic polymer resin having groups active to catalyze reaction and polymerization of the polymer of a second rod to form said cured resinous reaction product.

7. The method as defined in claim 4 in which a first rod comprises a polymer resin including reactive terminal epoxide groups and second rod comprises a polyamide having amine groups.

8. The method as defined in claim 4 in which one rod comprises blocked isocyanate groups and the second rod contains groups having active hydrogen for reaction with isocyanate groups which are unblocked in melting, mixing and application of the polymer resin material.

References Cited
UNITED STATES PATENTS

| | | | |
|---|---|---|---|
| 2,217,023 | 10/1940 | Lovell | 12—146 |
| 3,076,987 | 2/1963 | Shuttleworth | 12—146 |
| 3,316,573 | 5/1967 | Chaplick et al. | 12—146 X |

PATRICK D. LAWSON, Primary Examiner